(12) United States Patent
Riegelman

(10) Patent No.: US 6,341,465 B1
(45) Date of Patent: Jan. 29, 2002

(54) CORNER REINFORCEMENT FOR FRAME CHANNEL

(76) Inventor: Harry M. Riegelman, 9013 Mill Valley Cir., Apt. 178, Ft. Worth, TX (US) 76120

( * ) Notice: Subject to any disclaimer, the term of this patent is extended or adjusted under 35 U.S.C. 154(b) by 0 days.

(21) Appl. No.: 09/616,785

(22) Filed: Jul. 14, 2000

(51) Int. Cl.[7] .................................................. E04C 2/38
(52) U.S. Cl. ...................... 52/656.9; 52/698; 403/231; 403/401
(58) Field of Search ................. 52/656.9, 698; 403/401, 402, 231

(56) References Cited

U.S. PATENT DOCUMENTS

| | | |
|---|---|---|
| 2,846,734 A | 8/1958 | Zitomer |
| 3,376,670 A | 4/1968 | Jones |
| 4,222,209 A * | 9/1980 | Peterson ................. 403/401 X |
| 4,357,744 A | 11/1982 | McKenzie et al. |
| 4,503,640 A | 3/1985 | Stern |
| 4,513,546 A | 4/1985 | Gow |
| 4,586,348 A | 5/1986 | Nakayama et al. |
| 4,704,838 A | 11/1987 | Wendt |
| 4,822,205 A * | 4/1989 | Berdan ........................ 403/402 |
| 4,943,180 A | 7/1990 | Durhman |
| 5,048,997 A | 9/1991 | Peterson |

* cited by examiner

Primary Examiner—Robert Canfield
(74) Attorney, Agent, or Firm—Robert A. Seemann

(57) ABSTRACT

A corner element includes first and second sections that fit into legs of a framing channel, a first pair of parallel vertical panels on the first section interleave with a second pair of vertical parallel panels on the second section when the sections are rotated on an integral connecting hinge. A side of one of the panels of one section is recessed to receive one of the panels of the other section. One of the panels of one section is designed to receive a fastener that is guided by a through hole in a panel of the other section parallel to the height of panel of the other section.

6 Claims, 6 Drawing Sheets

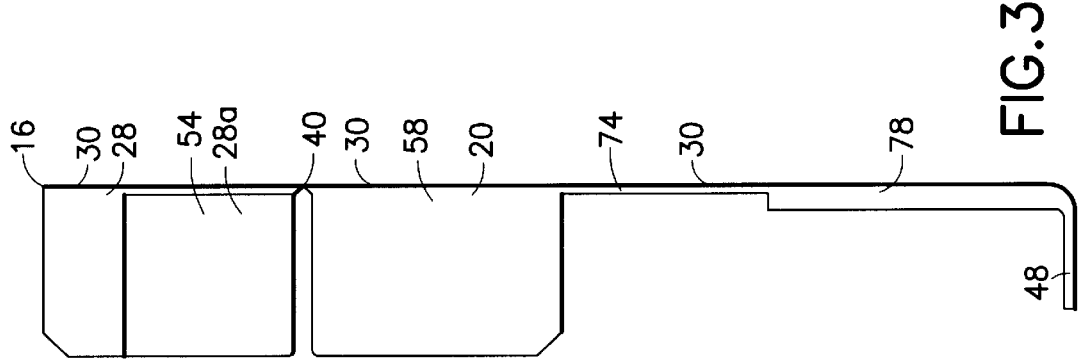
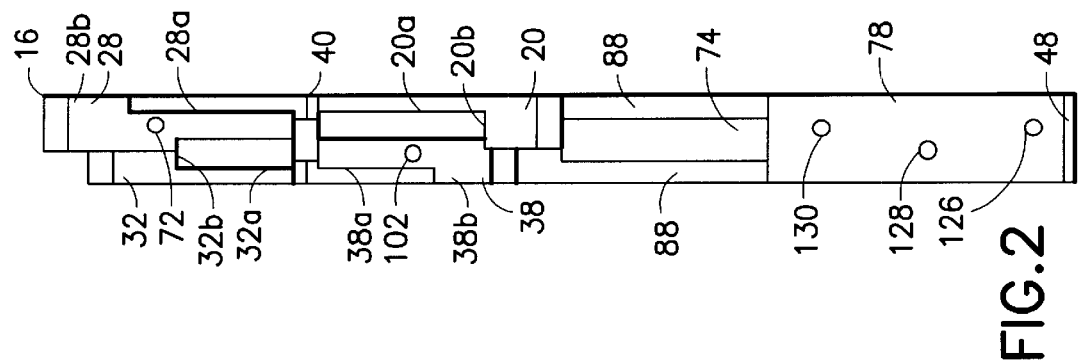
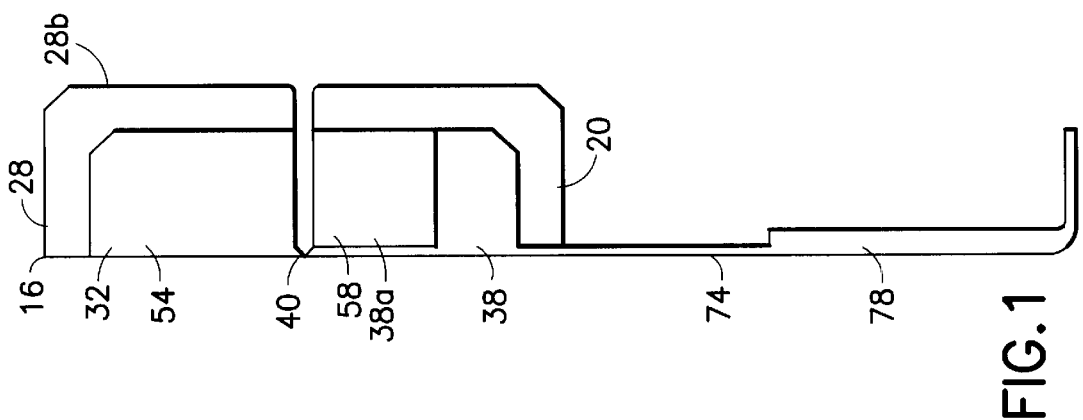

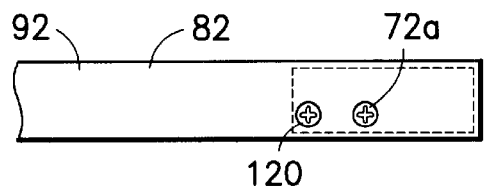
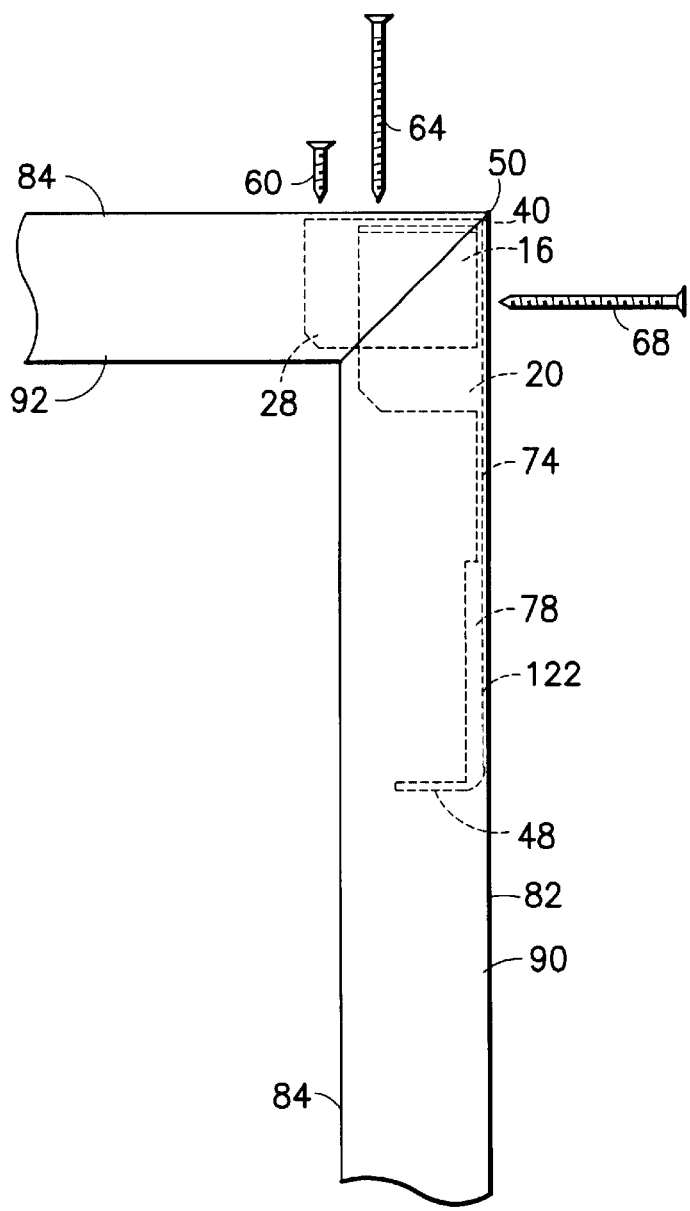
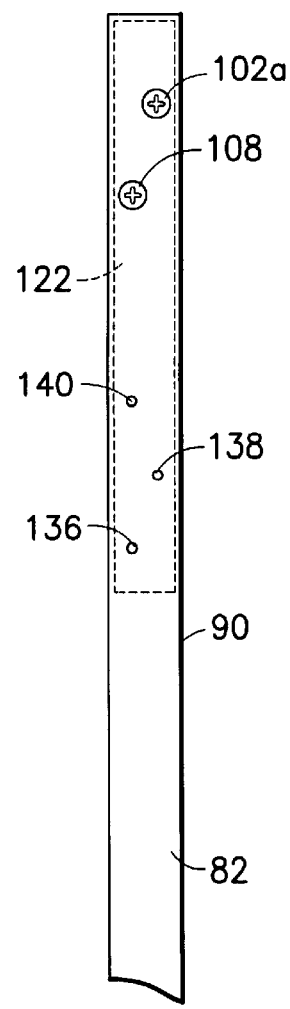
FIG.12
FIG.11
FIG.13

CORNER REINFORCEMENT FOR FRAME CHANNEL

BACKGROUND OF THE INVENTION

1. Field of the Invention

The invention pertains to reinforcement for corners of frames including screen door frames, more specifically to a corner element that extends into adjacent legs of the channel that forms the corner of the frame.

2. Description of the Prior Art

The prior art is replete with patented designs for strengthening the corner of a frame made of channel material by inserting a corner element into each of the adjacent corner legs. The channel may be formed by extrusion, rolling, folding, molding or other means.

U.S. Pat. No. 4,357,744 patented Nov. 9, 1982 by McKenzie et al., describes a corner connector that has a male end portion connected by a hinge to a female end portion. Each end portion has a lateral extension that applies outwardly directed force against the inner walls of a hollow intermediate frame in which the respective end portion is inserted so that the end portion frictionally locks into the intermediate frame, and so that the corner connector connects two intermediate frames. The frames are rotated toward one another by the hinge of the corner connector. The male portion has a protrusion that locks into a hole in the female portion, such as, for example, an arrowhead male member and female receiver hole, or a ball male member and female socket member.

U.S. Pat. No. 5,048,997 patented Sep. 17, 1991 by L. W. Peterson describes a corner connector that has a first arm connected by a hinge to a second arm. Each arm has a lateral extension that applies outwardly directed force against the inner walls of a hollow intermediate frame bar in which the respective arm is inserted so that the arm frictionally locks into the intermediate frame, and so that the corner connector connects two intermediate frames. The frame bars are rotated toward one another by the hinge of the corner connector. Each arm fits into the end of its respective spacer bar of a frame so that the arm seals the opening in the bar against loss of desiccant contained in the bar. Each arm has a shoulder surrounding the arm that extends laterally to the length of the respective arm and that seals against the end of the respective spacer bar. A finger having a width and parallel top and bottom surfaces, originating at a portion of the first arm that is adjacent to the hinge, extends over the hinge and makes an oblique bend over the hinge. When the bars are rotated to a right angle on the hinge, the finger fits loosely into a slot in the second arm that extends across the second arm obliquely to the length of the second arm.

SUMMARY OF THE INVENTION

It is one object of the invention to provide a corner element that provides rigidity for a frame corner to prevent twist of the frame at the corner and maintains the angle of the corner.

It is another object that the corner element reinforces a hinge mounting area of the frame.

It is another object that the corner element is a one piece molded item.

A corner element for mounting in a framing channel includes a first leg having a first opening and a second leg having a second opening, the corner element having a length, a height, and including a first section of the corner element shaped to fit in the first opening, a first panel on said first section extending along a plane that is parallel to the height and length of the corner element, a second section of the corner element shaped to fit in the second opening, a second panel on the second section extending along a plane that is parallel to the height and length of the corner element, a third panel on the second section, spaced from the second panel and extending along a plane that is parallel to the height and length of the corner element, and means for rotationally connecting the first section to the second section for moving the first panel parallel to the second panel in the space between the second panel and the third panel.

A third section of the corner element extends from the means for rotationally connecting the first section to the second section, a length sufficient to place the third section at a hinge mounting location in the framing channel when the corner element is mounted in the framing channel. Included is flexible means for spacing the third section from the first and second sections.

A through hole is provided in one of the panels for guiding a fastener within the panel along a line parallel to the height of the panel, and at least one of the other panels includes means for receiving the fastener.

A first side of one of the first panel, second panel, and third panels is recessed for receiving one of the other panels.

Other objects and advantages will be apparent to one reading the ensuing description of the invention.

BRIEF DESCRIPTION OF THE DRAWINGS

In order that the invention will be more fully comprehended, it will now be described, by way of example, with reference to the accompanying drawings, in which:

FIG. 1 is a left side view of a corner element of the invention.

FIG. 2 is a top view of the corner element of FIG. 1.

FIG. 3 is a right side view of the corner element of FIG. 1.

FIG. 11 is a schematic right side view of the channel of FIG. 5 folded into a corner, containing the corner element of FIG. 2 folded, and screws poised to enter the channel and corner element.

FIG. 12 is a schematic bottom view of the second leg of the channel of FIG. 5, and openings in the second leg for the screws of FIG. 11.

FIG. 13 is a schematic bottom view of the first leg of the channel of FIG. 5, and openings in the first leg for the screws of FIG. 11.

DESCRIPTION OF THE PREFERRED EMBODIMENTS

Figure 4:
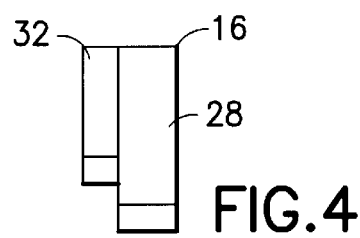
FIG. 4 is a back view of the corner element of FIG. 2.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Referring to FIGS. 1–4, panels 28 and 32 of corner element 16 interleave with panels 20 and 38 when section 54 is folded into section 58 by folding on hinge 40.

Corner element 16 must be strong, as it provides rigidity for the corner of the frame to prevent twist and support the angle.

Preferably corner element 16 is made of plastic, is molded in one piece, and molded in one piece with hinge 40 so that hinge 40 is a living hinge. One plastic suitable for the one piece design is polycarbonate.

When corner element 16 is folded, recessed surface 28a of panel 28 comes into sliding contact with recessed surface 20a of panel 20, and recessed surface 32a of panel 32 comes into sliding contact with recessed surface 38a of panel 38.

Section 74 is generally flat with shallow strengthening ribs 88 along the longitudinal edges, and is flexible. Section 78 receives rigidity from its thickness.

Corner element 16 is inexpensive to mold because panels 20, 28, 32 and 38 are parallel plates that are generally normal to the spine 30 which comprises hinge 40, and the recessed surfaces are generally parallel to the plates. The plates may be made hollow and include internal vertical strengthening ribs within the plates.

Figure 6:
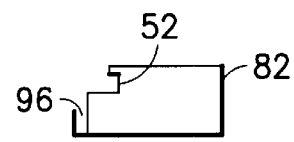
FIG. 6 is a schematic cross section view of the channel of FIG. 5, taken along 6—6.
Figure 5:
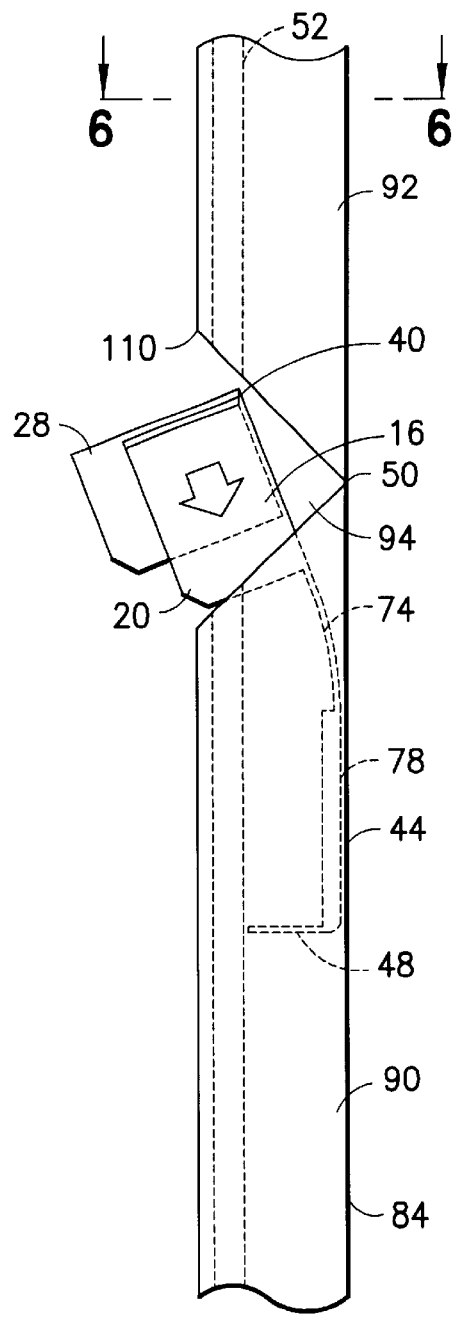
FIG. 5 is a right side view of a channel of a frame of a screen door, showing two legs of a corner of the frame before the channel is folded into a corner and the corner element of FIG. 2 inserted into one of the two legs and folded.

Referring to FIGS. 5 and 6, spacer 48 keeps section 78 against the bottom 82 of channel 84 by contacting the inner side of groove 52.

Corner element 16 is inserted into leg 90 of channel 84 by way of V cut-out 94. At the apex of V cut-out 94 is fold line 50 that is between legs 90 and 92 of channel 84.

In order to clear the top corner 110 of the V cut-out, corner element 16 is folded on hinge 40 so that the panels interleave.

Figure 7:
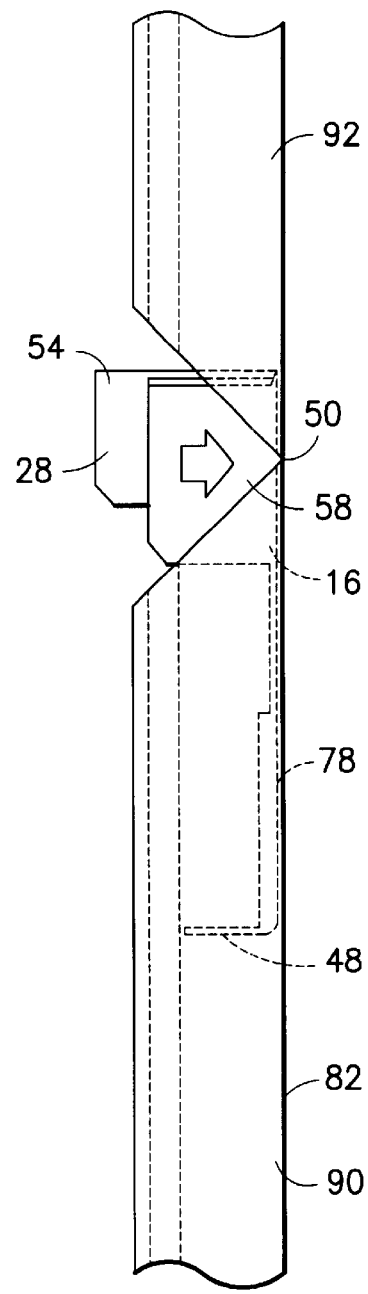
FIG. 7 is a right side view of the channel of FIG. 5, showing the corner element of FIG. 2 inserted into a first leg of the two legs with the fold portion of the corner element folded and generally centered on the fold line of the channel for forming the corner of the frame.

In FIG. 7, folded corner clement 16 is rotated into seating position against bottom 82 of channel 84.

Figure 8:
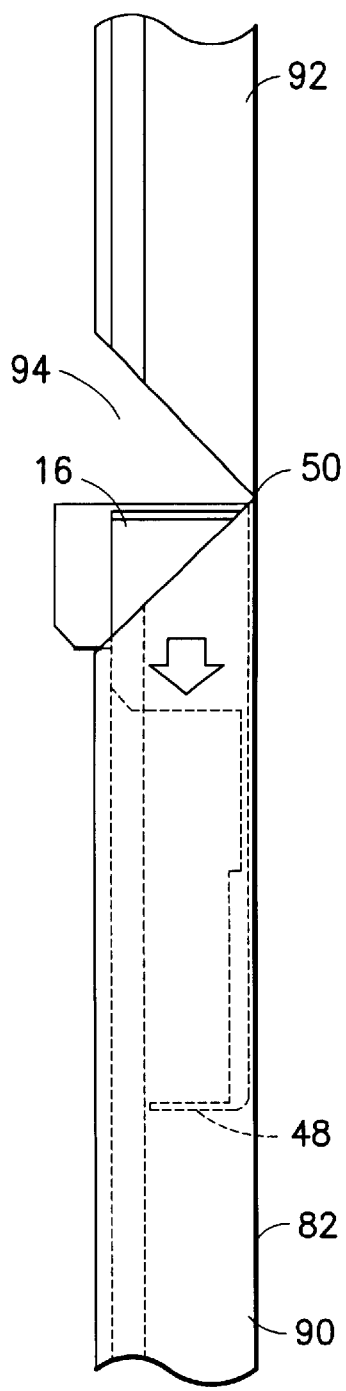
FIG. 8 is a right side view of the channel of FIG. 5, showing the corner element of FIG. 2 inserted into the first leg, with the fold portion of the corner element folded and positioned in the V-cut for the fold of the channel, so that the fold hinge of the folded portion is generally on the fold line of the channel.

In FIG. 8, folded corner element 16 is slid into leg 90 so that there is room to swing section 54 of the element down into leg 92.

Figure 9:
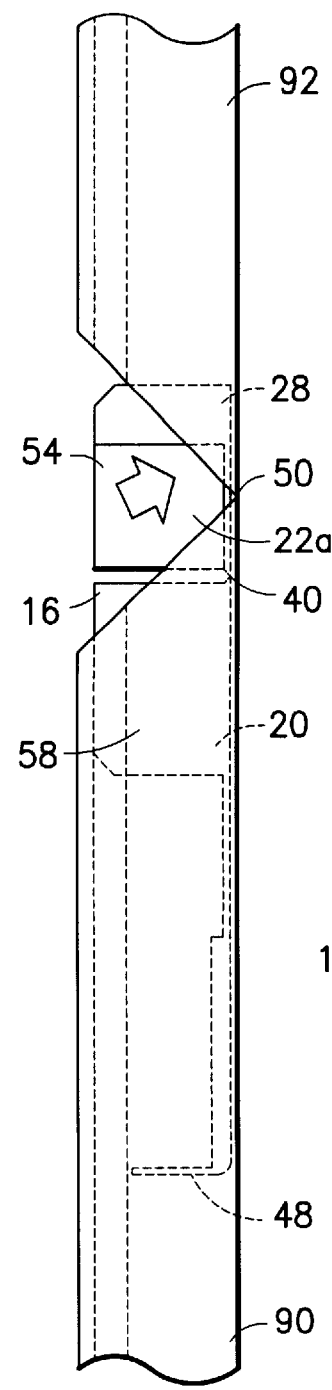
FIG. 9 is a right side view of the channel of FIG. 5, showing the corner element of FIG. 2 inserted into the first leg, with the fold portion of the corner element unfolded and positioned in the V-cut for the fold of the channel, so that the fold hinge of the fold portion is on the first leg.

In FIG. 9, section 54 is rotated on hinge 40 down into leg 92 as folded corner element 16 is slid further into leg 90.

Figure 10:
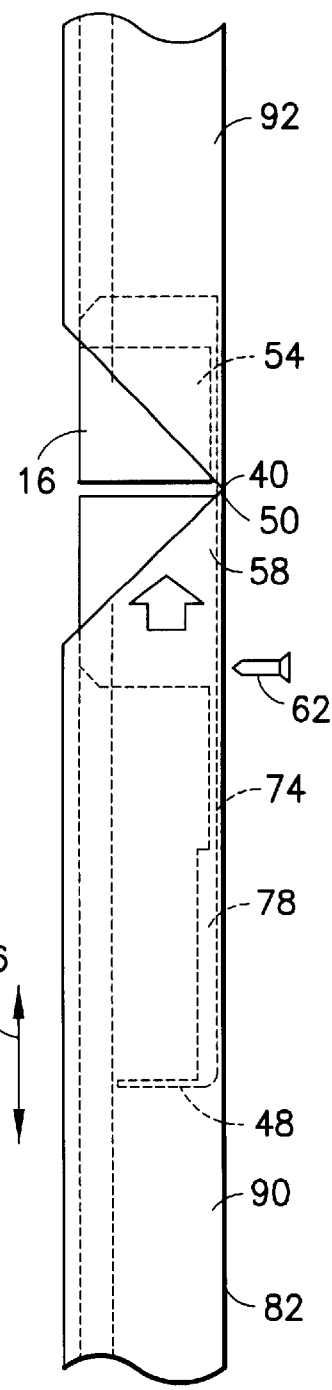
FIG. 10 is a right side view of the channel of FIG. 5, showing the corner element of FIG. 2 inserted into the first leg, with the fold portion of the corner element unfolded and positioned in the V-cut for the fold of the channel so that the fold portion extends into the second leg and the fold hinge of the fold portion is on the fold line of the channel for forming the corner of the frame.
Figure 14:
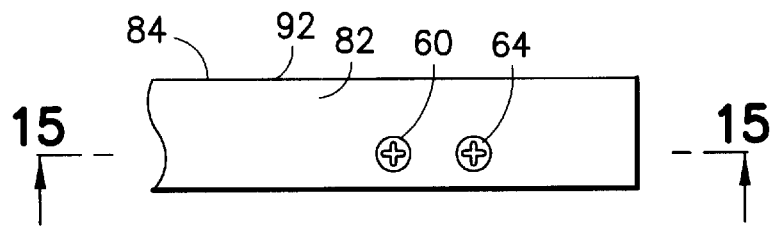
FIG. 14 is a schematic bottom view of the second leg of the channel of FIG. 5, and screws of FIG.
Figure 15:
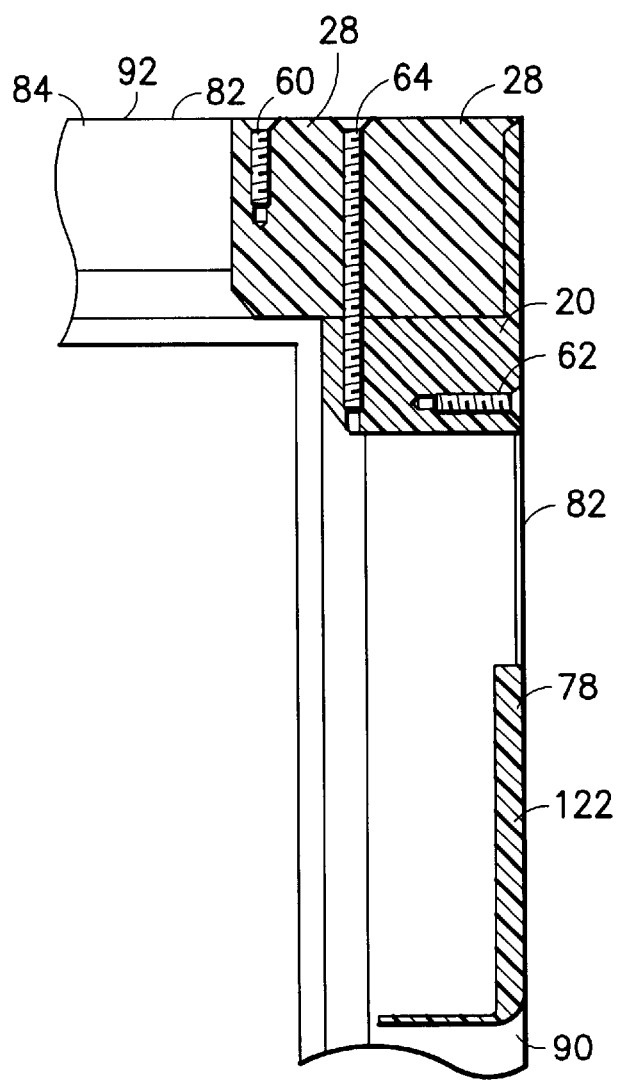
FIG. 15 is a schematic cross section of the first and second legs containing the folded corner clement, taken along 15—15 of FIG. 14.
Figures 16, 17:
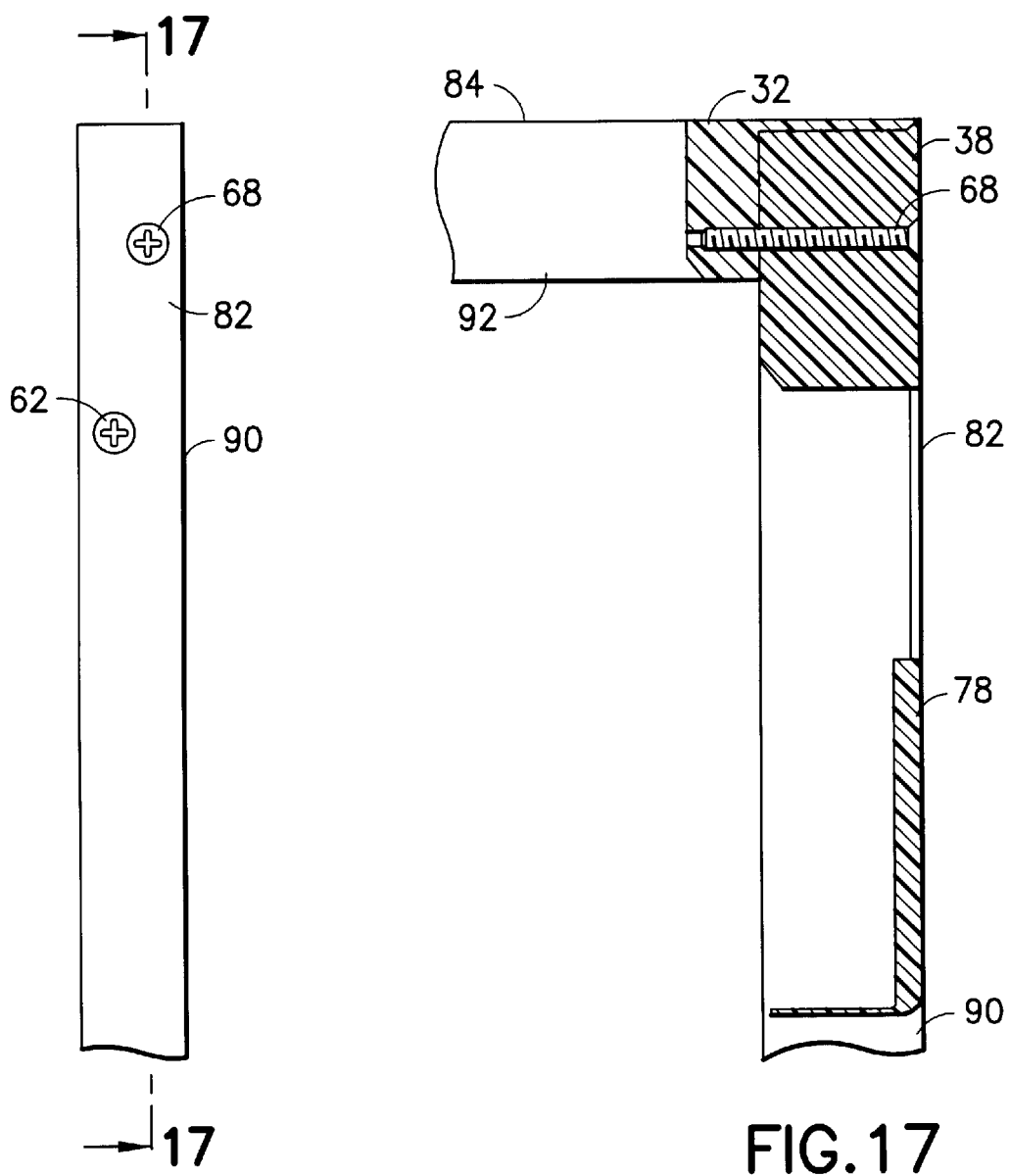
FIG. 16 is a schematic bottom view of the first leg of the channel of FIG. 5, and screws of FIGS. 10 and 11.
FIG. 17 is a schematic cross section of the first and second legs containing the folded corner element, taken along 17—17 of FIG. 16.

In FIG. 10, corner element 16 is slid into leg 92 until hinge 40 coincides with fold line 50 of channel 84. Screw 62 is inserted into hole 108 in the bottom of channel 84 leg 90, and screwed into spine 30 and panel 20 to keep section 58 from shifting longitudinally 116 in leg 90.

Referring to FIGS. 11—17, channel 84 is folded on fold line 50 as corner element 16 is folded on hinge 40, whereby panels 28 and 32 interleave with panels 20 and 38.

Screw 60 is inserted into hole 120 in the bottom of channel 84 leg 92, and screwed into spine 30 and panel 28.

Screw 64 is inserted into hole 72a in the bottom of channel 84 leg 92, into through hole 72 in panel 28. Hole 72 is parallel to the plane of the panel and perpendicular to spine 30 where panel 28 is molded to the spine. Hole 72 is parallel to the portion of spine 30 that is in leg 90 when the channel is folded into a corner. Screw 64 enters into face 20b in recess 20a of panel 20 and into panel 20. The screw is tightened so that it draws panel 28 face 28b toward face 20b so that spine 30 is fixed in a right angle with its apex at hinge 40.

Screw 68 is inserted into hole 102a in the bottom of channel 84 leg 90, into through hole 102 in panel 38. Hole 102 is parallel to the plane of the panel and perpendicular to spine 30 where panel 38 is molded to the spine. Hole 102 is parallel to the portion of spine 30 that is in leg 92 when the channel is folded into a corner. Screw 68 enters into face 32b in recess 32a of panel 32 and into panel 32. The screw is tightened so that it draws panel 38 face 38b toward face 32b so that spine 30 is fixed in a right angle with its apex at hinge 40.

The interleaved panels and spine 30 drawn together in the folded configuration provide resistance to twist. Screwed to the transverse bottom 82, the assembly forms a rigid frame corner.

Section 78 extends over hinge mount area 122 of leg 90 so that holes 126, 128 and 130 in section 78 spine 30 align with holes 136, 138 and 140 respectively in bottom 82 of leg 90 for hinge screws.

Section 74 provides support in tension or in compression between a hinge and corner element 16, Drawing Designators (Informal List)

16 corner element
20 panel
20a recessed surface
20b face on panel 20 in recess 20a
28 panel
28 panel
28a recessed surface
28b face on panel 28
30 spine
32 panel
32a recessed surface
32b face on panel 32 in recess 32a
38 panel 38a recessed surface
38b face on panel 38
40 hinge
48 spacer
50 fold line
52 groove
54 section
58 section
60 screw
62 screw
64 screw
68 screw
72 through hole in panel 28
72a hole in bottom of channel
74 section
78 section
82 bottom of channel 84
84 channel
88 rib
90 leg
92 leg
94 V cut-out
96 slot
102 hole in panel 38
102a hole in bottom of channel
108 hole
110 top corner of V cut-out
116 longitudinally, direction arrow
120 hole
122 hinge mount area of leg 90
126 hole in area 78 spine 30
128 hole in area 78 spine 30
130 hole in area 78 spine 30
136 hole in bottom 82 of leg 90
138 hole in bottom 82 of leg 90
140 hole in bottom 82 of leg 90 when corner element 16 is at the bottom or at the top respectively of the frame formed by the channel.

While the preferred embodiment of the invention has been shown and described, it will be understood that the invention may be embodied otherwise than as herein specifically illustrated or described, and that certain changes in form and arrangement of parts and in the specific manner of practicing the invention may be made without departing from the underlying idea or principles of this invention within the scope of the appended claims.

What I claim is:

1. A corner element for mounting in a framing channel comprising a first leg having a first opening and a second leg having a second opening, said corner element having a length, a height, and comprising:

a first section of said corner element shaped to fit in said first opening, a first panel on said first section extending along a plane that is parallel to the height and length of said corner element a second section of said corner element shaped to fit in said second opening, a second panel on said second section extending along a plane that is parallel to the height and length of said corner element, a third panel on said second section, spaced from said second panel and extending along a plane that is parallel to the height and length of said corner element, and means for rotationally connecting said first section to said second section for moving said first panel parallel to said second panel in the space between said second panel and said third panel, a through hole in said first panel for guiding a fastener within said first panel along a line parallel to the height of said first panel.

2. The corner element of claim 1, further comprising at least one of said second panel and said third panel comprising a lateral protrusion for receiving a fastener from said through hole.

3. A corner element for mounting in a framing channel comprising a first leg having a first opening and a second leg having a second opening, said corner element having a length, a height, and comprising:

a first section of said corner element shaped to fit in said first opening, a first panel on said first section extending along a plane that is parallel to the height and length of said corner element, a second section of said corner element shaped to fit in said second openinig, a second panel on said second section extending along a plane that is parallel to the height and length of said corner element, a third panel on said second section, spaced from said second panel and extending along a plane that is parallel to the height and length of said corner element, and means for rotationally connecting said first section to said second section for moving said first panel parallel to said second panel in the space between said second panel and said third panel, a through hole in said first panel for guiding a fastener within said first panel along a line parallel to the height of said first panel, means on at least one of the second and third panels for receiving a fastener from said through hole.

4. A corner element for mounting in a framing channel comprising a first leg having a first opening and a second leg having a second opening, said corner element having a length, a height, and comprising:

a first section of said corner element shaped to fit in said first openinig, a first panel on said first section extending along a plane that is parallel to the height and length of said corner element, a second section of said corner element shaped to fit in said second opening, a second panel on said second section extending along a plane that is parallel to the height and length of said corner element, a third panel on said second section, spaced from said second panel and extending along a plane that is parallel to the height and length of said corner element, and means for rotationally connecting said first section to said second section for moving said first panel parallel to said second panel in the space between said second panel and said third panel, a through hole in said second panel for guiding a fastener within said second panel along a line parallel to the height of said second panel.

5. The corner element of claim 4, further comprising:

means on said first panel for receiving a fastener from said through hole.

6. A corner element for mounting in a framing channel comprising a first leg having a first opening and a second leg having a second opening, said corner element having a length, a height, and comprising:

a first section of said corner element shaped to fit in said first opening, a first panel on said first section extending along a plane that is parallel to the height and length of said corner element, a second section of said corner element shaped to fit in said second opening, a second panel on said second section extending along a plane that is parallel to the height and length of said corner element, a third panel on said second section, spaced from said second panel and extending along a plane that is parallel to the height and length of said corner element, and means for rotationally connecting said first section to said second section for moving said first panel parallel to said second panel in the space between said second panel and said third panel, a first side of one of the first panel, second panel, and third panels being recessed for receiving one of the other panels.

* * * * *